United States Patent [19]

Narkon et al.

[11] Patent Number: 5,110,221
[45] Date of Patent: *May 5, 1992

[54] SELF-ALIGNING TRACK ROLLER

[75] Inventors: Glennwood H. Narkon, Rockville; Stanley S. Orkin, Vernon, both of Conn.

[73] Assignee: Kamatics Corporation, Bloomfield, Conn.

[*] Notice: The portion of the term of this patent subsequent to Jun. 27, 1989 has been disclaimed.

[21] Appl. No.: 285,601

[22] Filed: Dec. 16, 1988

Related U.S. Application Data

[63] Continuation-in-part of Ser. No. 77,395, Jul. 24, 1987, Pat. No. 4,842,424.

[51] Int. Cl.⁵ .................................... F16C 23/04
[52] U.S. Cl. ................................ 384/203; 384/280
[58] Field of Search ............ 384/203, 204, 280, 145, 384/146, 210

[56] References Cited

U.S. PATENT DOCUMENTS

| | | | |
|---|---|---|---|
| 2,189,117 | 2/1940 | Prentice | 384/203 |
| 3,108,830 | 10/1963 | Fierstine | 384/203 |
| 3,231,299 | 1/1966 | Birney et al. | 384/203 |
| 4,057,355 | 11/1977 | Allison | 384/203 |
| 4,447,094 | 5/1984 | Trudeau et al. | 384/145 |

Primary Examiner—Lenard A. Footland
Attorney, Agent, or Firm—Cushman, Darby & Cushman

[57] ABSTRACT

A track-roller bearing assembly is disclosed which includes a fixed inner ball race member having an outwardly facing arcuate peripheral bearing surface; an annular body of self-lubricating bearing material affixed to the outwardly bearing surface of said inner race; and a coaxial outer race which is rotatable about an axis of the inner race and anguarly displaceable relative to the axis of the inner race so as to accommodate track deflections or irregularities. The track-roller further includes a resilient element disposed between respective ends of the inner and outer races so as to bias the races back into axial alignment after they have been angularly displaced relative to each other.

22 Claims, 3 Drawing Sheets

SELF-ALIGNING TRACK ROLLER

This is a continuation of application Ser. No. 07/077,395, filed Jul. 24, 1987, now U.S. Pat. No. 4,842,424.

BACKGROUND OF THE INVENTION

The present invention relates to a track roller and more particularly, to a self-aligning track roller for accommodation to variable track surfaces comprising a co-engaging inner race and outer race movable relative to one another wherein an elastomeric element such as a ring is disposed between respective ends of the inner and outer races so as to bias the inner race into alignment with the outer race. Further, the inner race has a bearing surface provided with a self-lubricating material which is engageable with and movable relative to the bearing surface of the outer race.

At present, track rollers being used incorporate a crown radii on the outer diameter of the outer race to compensate for track deflections and irregularities. This reduces the contact area between the roller and the mating surface of the track. An increase in contact bearing pressure results due to the reduced contact area which has caused excessive wear and distress to the track surface.

Further, the conventional track roller bearings are constructed with rolling elements positioned between the inner and outer races and require a lubricant such as grease. Addition of lubricant to the rolling elements is periodically required to maintain the operational performance and to add corrosion resistance. Such bearings are subject to failure where fracturing of the rolling elements and spalling of the inner race occur. In addition, the performance of these track roller bearings depends on the effectiveness of seals incorporated therein which ensure that the grease lubrication is maintained within the varying surface area, proper, and that the grease lubrication is not contaminated from external sources.

It is known to incorporate a self-lubricating liner system as an alternative to the rolling element track roller surface of the outer race so as to operate against the bearing surface of a hardened inner race. These bearing assemblies have the advantage that they do not require periodic lubrication and they have a generally higher rolling load capacity. In addition, static radial load capacity of these bearing assemblies is substantially higher than the rolling element bearing assemblies with high thrust capacity being ensured by the use of the separate self-lubricating liner system. These self-lubricating type bearing assemblies are discussed for example in U.S. Pat. Nos. 4,048,370 and 4,134,842.

The self-lubricating liner systems with the liner attached to the inner diameter of the outer race were designed in accordance with the belief that the wear experienced during the life of the bearing system could be distributed over the full circumference of the liner and thus result in extended surface life. Nevertheless, it has been found that because of the rotation of the outer race liner in relation to the stationary inner race and the unidirectional load application, liner systems with a compression modulus of up to about 1 million psi are subjected to material deflection. More particularly, the mismatch of the inner race circumferential surface to the outer race by differential tolerances and the thickness of the liner system provide the mechanism which permits local deflection of the liner as the outer race moves relative to the inner race when loaded. Therefore, under a steady applied load, while moving in relation to the inner race, high shearing action and tensile forces are imposed on the liner immediately in front of the progressing load action of the inner race. This is known as ploughing. When combined with fluid contamination, the liner is further distressed due to the wedging action of fluid in front of the advancing inner race slider.

Lubricating material affixed to the outer race in a track-roller bearing assembly is subjected to distortion and consequent reduced service life relative to the arrangement of the present invention. The induced liner deflection when loaded by the inner race during rotation of the outer race adversely affects the bond between the lubricating material and the outer race, and as the bond fails, the lubricating material is pinched between the inner and outer races without any support and tends to be squeezed out.

SUMMARY OF THE INVENTION

The bearing assembly of the present invention overcomes the above-mentioned problems associated with the provision of a drawn radii by providing co-engaging inner-and outer races that are self-aligning. More particularly, in accordance with the present invention, an elastomeric element is provided about at least one and preferably both ends of the inner race adjacent a respective end of the outer race. In this manner, when relative angular rotation of the inner and outer races distorts the elastomeric element(s) the resiliency of the element(s) resists the deformation and urges the races into their original axial alignment.

The bearing assembly of the present invention also avoids the liner bond failure occasioned by the above-described ploughing action and exhibits a significantly extended wear life. In the bearing assembly of the present invention the self-lubricating bearing material is preferably provided on the outer bearing surface of the inner material. This construction ensures positive contact between the liner system and mating surfaces so that fluid contamination does not become a mechanical wedging tool.

DETAILED DESCRIPTION

Figure 1:
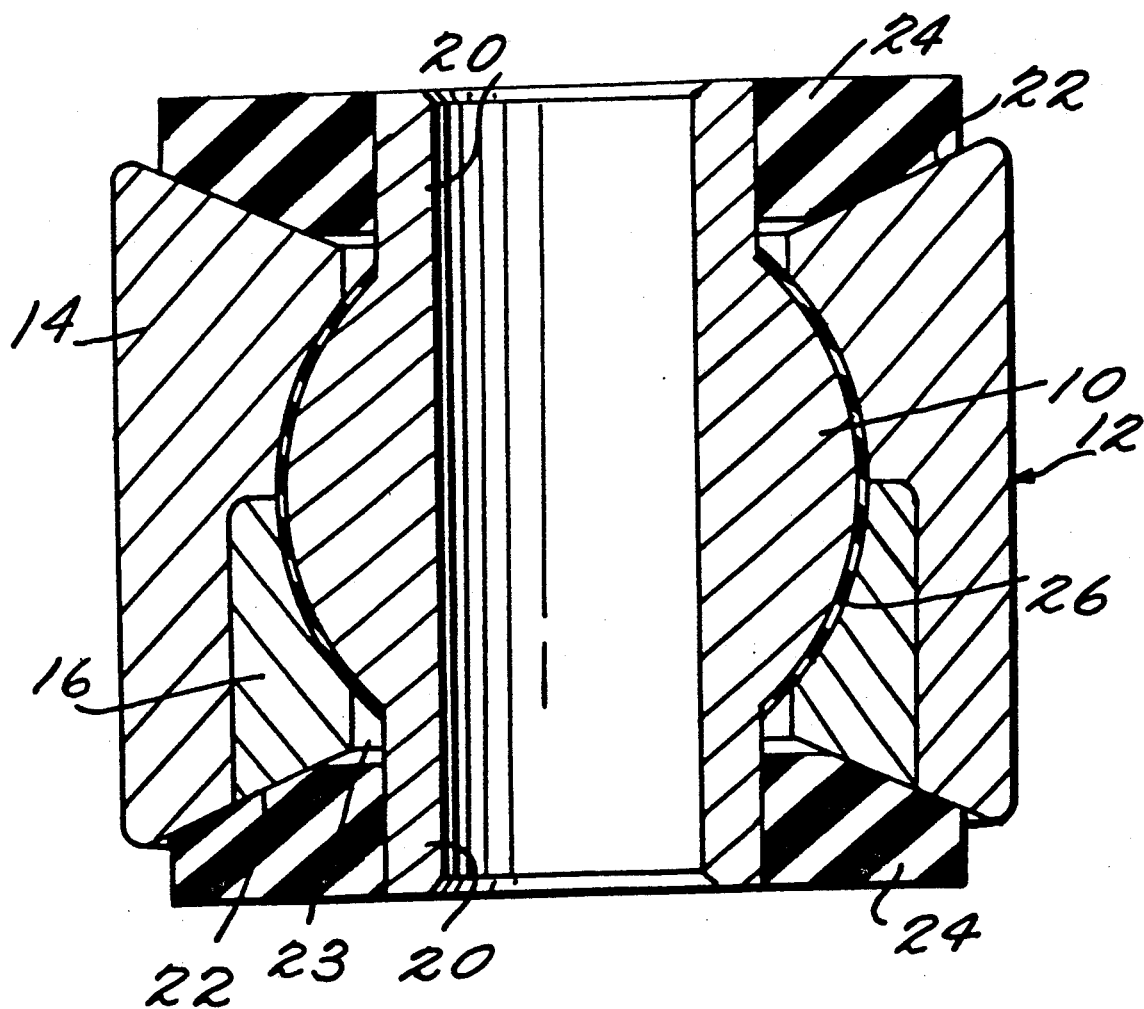
FIG. 1 is a sectional view illustrating a first embodiment of the self-adjusting, self-lubricating track roller of the present invention.

FIG. 1 is a sectional view of the improved bearing assembly of the present invention with the shaft omitted for clarity. As can be seen, the bearing assembly comprises an inner ball race 10 and an outer race 12 engageable with and rotatable relative to inner ball race 10. In the illustrated embodiment outer race 12 includes first and second parts 14 and 16. Further, outer race 12 has an inner arc surface defined by the inner portions of parts 14 and 16 that has a length less than the arcuate surface of inner race 10 so as to allow relative angular movement of races 10 and 12 as will be described more fully below.

Inner race 10 of the illustrated embodiment includes a ball portion 18 and first and second cylindrical portions 20. Cylindrical portions 20 extend axially beyond an associated end face 22 of outer race 12. Further, the end faces 22 are inwardly inclined so as to be conical in shape and a gap 23 is provided between the cylindrical portions 20 and the end faces 22 so that the inner and outer races 10 and 12 can be angularly displaced relative to one another to accommodate track deflections.

To provide the self-aligning characteristics of the bearing assembly, an elastomeric ring 24 is provided about at least one and preferably both cylindrical portions 20 between same and an associated end face 22. The elastomeric ring 24 so disposed is resiliently distorted when races 10 and 12 are angularly displaced because of, for example, track irregularities or other mechanical relations in a structure. However, the resiliency of ring 24 causes same to urge the races 10, 12 back into axial alignment and hence, the bearing assembly is self-aligning. As is further apparent, elastomeric ring(s) 24 also serve to cushion relative angular movement so that, despite track deflections or irregularities, motion is more smoothly transmitted while stresses on the assembly are minimized.

Figure 2:
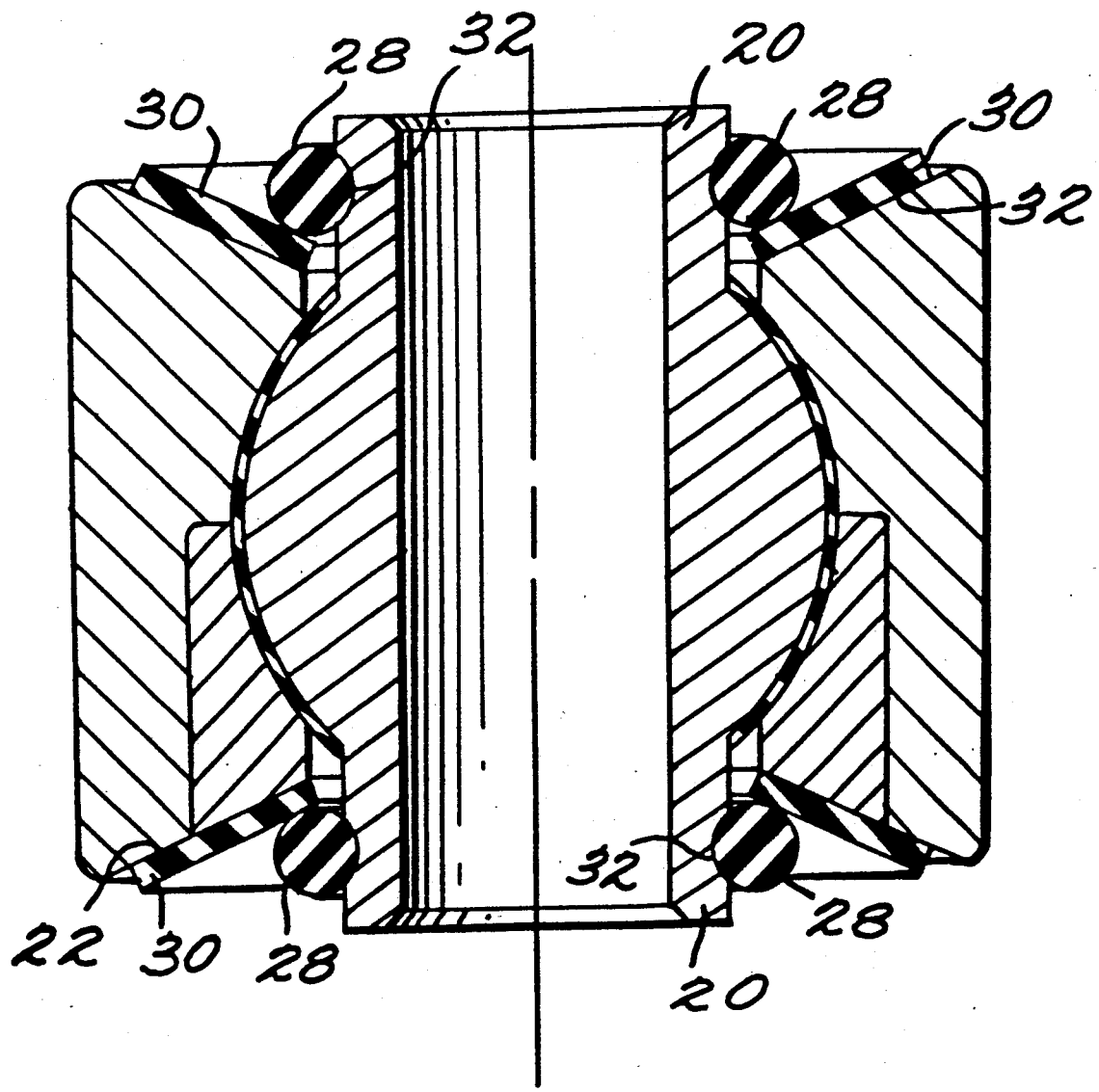
FIG. 2 is a sectional view illustrating a second embodiment of the track roller of the present invention.

Referring to FIG. 2, an alternate embodiment of a self-aligning roller bearing is shown. In this embodiment, rather than wedge-shaped ring 24, realignment is provided by the combination of an O-ring 28 mounted on at least one and preferably both end portions 20 and an elastomeric washer 30 which is disposed between each O-ring 28 and its associated end face 22. Of course an appropriatly sized O-ring formed of an appropriate material could be used in some circumstances without a washer 30. Further, the illustrated embodiment, a recess 32 is defined on the surface of end portion 20 to receive O-ring 28 and retain the same in position.

Figure 3:
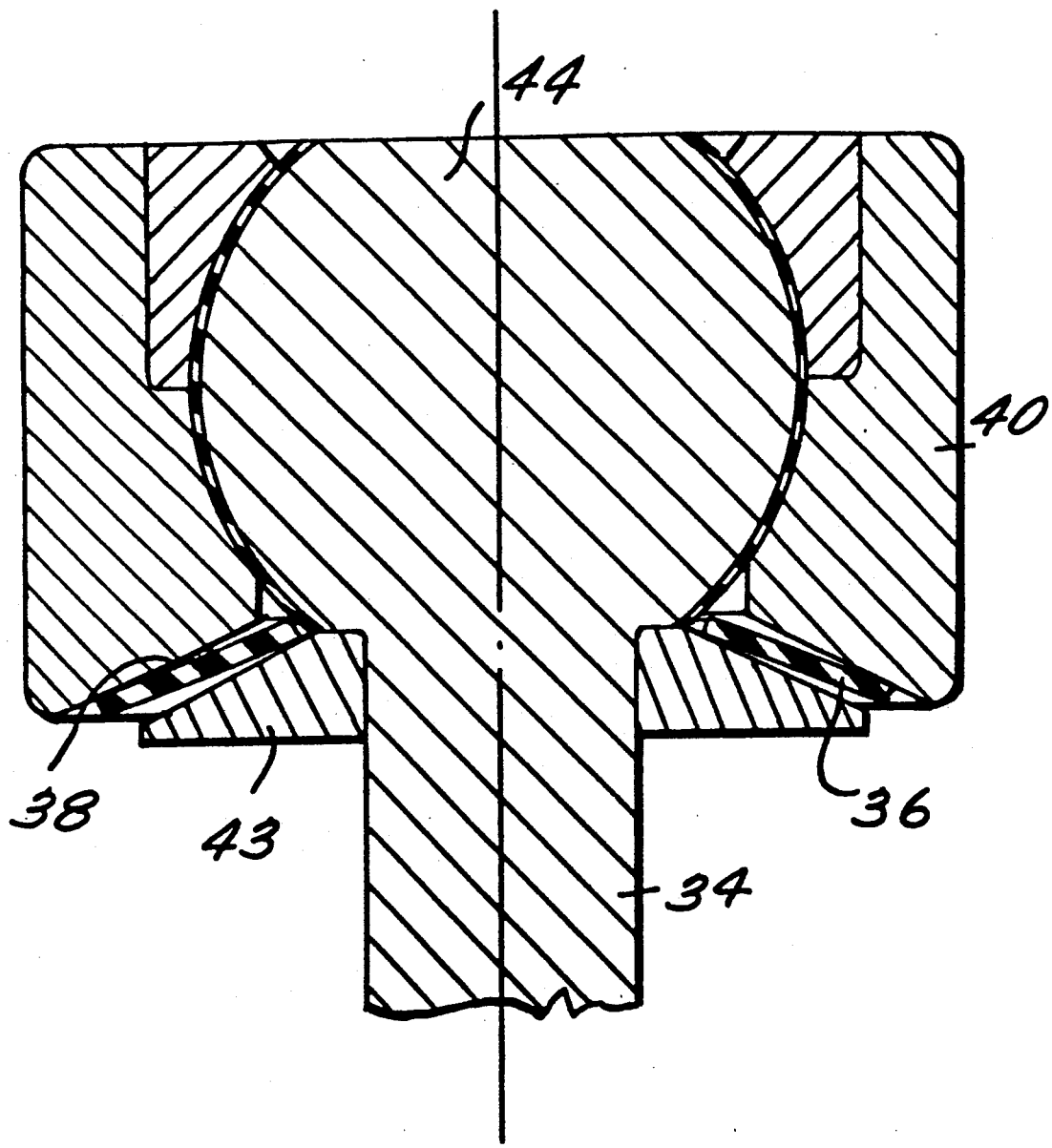
FIG. 3 is a sectional view illustrating yet another embodiment of the present invention.

Turning to FIG. 3, yet another embodiment of the present invention is shown, on an inner race that is formed with only a single end portion 34. In this embodiment, the self-aligning function is achieved through the combination of an elastomeric washer 36 disposed between an end face 38 of the outer race 40 and a rigid wedge shaped ring 43 mounted to end portion 34 of inner race 44.

The elastomeric ring(s) 24 as well as O-ring(s) 28 and washer(s) 30, 36 provided in accordance with the present invention of course may be formed from any suitable material but are preferably formed from, for example, urethane, teflon, silicone, nitrile, neoprene or vyton and may be adhesively secured in place as shown.

As can be further seen in FIGS. 1, 2 and 3, in the bearing assembly of the present invention, unlike the bearing assemblies of the prior art, the outer surface of inner race 10 is provided with a self-lubricating bearing material 26 fixedly secured thereto. Bearing material 16 can be fixed to the outer diameter of the inner race by any suitable means. The bearing material 16 so affixed is engageable with and movable relative to the inner surface of the outer race 12. Further, bearing material 16 extends the entire arc length of the inner race 10 outer diameter so that it will be disposed between outer race 12 and inner race 10 even at the extremes of relative angular motion due to track deflections or irregularities.

Outer race 12 of the bearing assembly of the present invention is made of metal, preferably stainless steel (wrought or powder metallurgy) such as 440C, 13-8PH, AUS 5617-Custom 455, 17-4 PH, 300 series, and more preferably 13-8PH, although other metals such as high carbon steel 52100 as well as case hardened titanium, anodized aluminum, Inconel, Hastelloy and A286 can also be employed, so as to provide a metal inner bearing surface.

Inner race 10 of the bearing assembly of the present invention can also be made of a metal such as defined above, and more preferably stainless steel 17-4PH. The outer surface thereof has fixedly secured thereto the self-lubricating material.

The self-lubricating material can be a solid organic lubricant such as a solid polyester, polyamide, polyphenylene sulfide, polyarylsulfone, a polyfluorocarbon or, a cured acrylate as disclosed in U.S. Pat. No. 4,048,370 and incorporated herein by reference or even a woven fiber matrix impregnated, for example, with a cured acrylate composition as disclosed in U.S. Pat. No. 4,134,842 also incorporated herein by reference or other resin systems. The self-lubricating material can be secured to the outer surface 29 of inner race by known methods.

Representative polyesters include aromatic polyesters Such as p-oxybenzoyl polyester which is commercially available, for instance, under the tradename Ekanol and sold by the Carborundum Co. This polyester material has a density ranging from 1.44–1.48 gcc and a melting point of about 800° F. Polyamides usefully employed in the present invention include, for instance, Nylon-6 and Nylon-6,6 although it will be recognized that other nylon formulations can also be employed. Aromatic poly p-phenylene sulfides can also be employed and such polymers can have a molecular weight ranging as high as about 13,000. They are available, commercially, under the tradename of Ryton by Phillips Petroleum Company, such a product having a specific gravity of about 1.34, a density of about 0.0485 lbs/in$^3$ and a melting point of about 550° F. Polyfluorocarbons usefully employed in the present invention include polytetrafluoroethylene. Included in the polyaryl sulfones suitable for use in the present invention are those which have a molecular weight ranging from about 30,000 to 60,000. One convenient polyaryl sulfone is that sold commercially under the tradename Polymer 360-3M Astrel 360 having a specific gravity of 1.36, a density of 0.049 lbs/in$^3$, a compressive strength at 73° F. of 17,900 psi and a melting point of about 550° F. Polyimides employed in the present invention are aromatic polyimides which are available commercially under, for instance, the tradenames 6f Vespel SP-1 (DuPont) which has a specific gravity ranging from about 1.41–1.43, a density of about 0.052 lbs/in$^3$, a compressive strength at 73° F. of about 24,000 psi and a heat distortion temperature at 264 psi of about 680° F. A modified Vespel SP-1 polyimide is Vespel SP-21 which contains 15 weight percent graphite, has a specific gravity of about 1.51, a density of about 0.0546 lbs/in$^3$ and a compressive strength at 73° F. of about 18,000 psi. Other polyimides include one available commercially as XPl-182 by American Cyanamid which has a specific gravity of about 1.28, a density of about 0.046 lbs/in$^3$, a compressive strength at 73° F. of about 25,000 psi and a heat distortion temperature at 264 psi of about 440° F. Still another polyimide commercially available is that sold under the tradename of Genom 3010 by General Electric and has a specific gravity of about 1.90, a density of about 0.068 lbs/in$^3$, a compressive strength at 73° F. of about 41,900 psi and a heat distortion temperature at 264 psi of about 660° F. Polyimides containing polytetrafluoroethylene or graphite fibers can also be used.

When the self-lubricating material selected is a cured mixture of an acrylate composition and a particulate solid lubricant, such as polytetrafluoroethylene, the acrylate composition can be selected from the group consisting of (a) a mixture of a major amount of a liquid acrylic ester selected from the group consisting of di-, tri-, and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

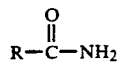

$$R-\overset{O}{\underset{\|}{C}}-NH_2$$

wherein R is selected from the group consisting of hydrogen and aliphatic hydrocarbon of 1–20 carbon atoms in an amount sufficient to copolymerize said acrylic ester and prepolymer, (b) a mixture of acrylic ester monomer, a peroxidic initiator in an amount sufficient to initiate polymerization of said monomer and an aminoalkoxyalkylamine of the formula $R_1-N(H)R_2[OR_3]_xN(H)R_4$ wherein x is an integer of 1–6 inclusive, each of $R_1$ and $R_4$ is selected from the group consisting of hydrogen and lower alkyl and each of $R_2$ and $R_3$ is a lower alkyl linking bridge between N and O, in an amount sufficient to accelerate the polymerization of said monomer, (c) a mixture of an acrylic ester of an alkyl amino alkyl alcohol and an effective amount of hydroperoxide catalyst, said acrylic ester having the formula

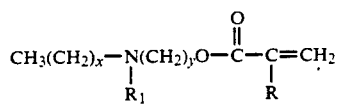

$$CH_3(CH_2)_x-\underset{R_1}{N(CH_2)_y}O-\overset{O}{\underset{\|}{C}}-\underset{R}{C}=CH_2$$

wherein x is an integer of 0–5 inclusive, y is an integer of 1–6 inclusive, R is selected from the group consisting of hydrogen, halogen, hydroxy, cyano and lower alkyl and $R_1$ is selected from the group consisting of hydrogen and alkyl having 1–6 carbon atoms, (d) a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxidic initiator and an oxyalkylamine of the formula $(H)_mN[(CH_2)_x(OR_1)_yOR_2]_n$ wherein m and n are each integers of 1 to 2 inclusive, the total of m and n is 3, x is an integer of 1 to 6 inclusive, y is an integer of 0 to 6 inclusive, $R_1$ is lower alkyl and $R_2$ is selected from hydrogen and lower alkyl, (e) a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixtures thereof, a peroxidic initiator of an amount sufficient to initiate polymerization of said monomer and a member selected from the group consisting of rhodanine and a hydrazide of the formula

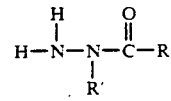

$$H-\underset{\underset{R'}{|}}{N}-\overset{H}{\underset{|}{N}}-\overset{O}{\underset{\|}{C}}-R$$

wherein R and R' are selected from separate groups and an interconnected group forming a cyclic ring, R is further selected from the group consisting of hydrogen, alkyl, cycloalkyl, aryl and alkoxy and R' is selected from the group consisting of hydrogen, alkyl, cycloalkyl, acyl and dithiocarbonyl in an amount sufficient to accelerate the polymerization of said monomer; and (f) a mixture of a monomer of the formula

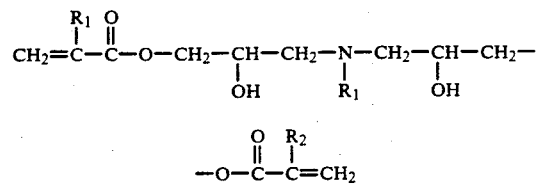

$$CH_2=\overset{R_1}{\underset{|}{C}}-\overset{O}{\underset{\|}{C}}-O-CH_2-\underset{\underset{OH}{|}}{CH}-CH_2-\underset{\underset{R_1}{|}}{N}-CH_2-\underset{\underset{OH}{|}}{CH}-CH_2-$$
$$-O-\overset{O}{\underset{\|}{C}}-\underset{\underset{R_2}{|}}{C}=CH_2$$

wherein $R_1$ and R are selected from the group consisting of hydrogen and lower alkyl and R is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine.

When the self-lubricating material selected is a woven fiber matrix impregnated with a cured acrylate composition, the woven fiber matrix can comprise a material woven from a mixture of fibers, one face of the material comprising lubricating fibers, the other comprising reinforcing fibers. Conveniently the woven fiber matrix can be fabricated from polytetrafluoroethylene fibers, as the lubricating fibers; and from such reinforcing fibers as KEVLAR fibers, polyethylene terephthalate (DACRON) fibers as well as fiberglass and graphite fibers. Preferably, the reinforcing fibers are KEVLAR fibers, available commercially under the tradename KEVLAR PRD 49, by DuPont. KEVLAR is an organic polymeric compound known as an aromatic polyamide, i.e. an aramid. It is a high strength, high modulus fiber made from long chain synthetic polyamides wherein at least 85 percent of the amide linkages are attached directly to two aromatic rings. KEVLAR fiber is extremely stable, has high strength, toughness and stiffness characteristics. The density of KEVLAR PRD 49 is 1.45 g/cc and its mechanical properties lie between the values of glass and graphite filament. The curable acrylate, which can be any of those defined above at (a) through (f) is present in an amount sufficient to impregnate the woven fiber matrix and to bond the same to the outer surface of the inner race.

As is apparent from the foregoing, to compensate for track deflections and irregularities, the track roller of the present invention is self-adjusting in that the outer race can rotate angularly relative to the axis of the inner race in response to the variable track surface. This maintains the contact area between the rolling and the mating surface of the track so that the contact bearing pressure will not be increased and excessive wear and distress of the track surface is minimized. Further, the track roller of the present invention is self-aligning in that the inner and outer races are urged back into axial alignment when the races have been so angularly displaced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A track-roller bearing assembly comprising:
   an inner ball race member having a central axis and an outwardly facing arcuate peripheral bearing surface;
   an outer race member coaxial with said central axis of said inner race member and including a bearing portion having an annular arcuate surface, said outer race member being rotatable about said central axis of said inner race member and angularly displacable relative to said axis; and
   means for realigning said central axis of said outer race member with said central axis of said inner race member when said race members have rotated angularly relative to each other, said realigning means being mounted between and immediately adjacent the respective end portions of said inner and outer race members.

2. A track-roller bearing assembly as in claim 1, wherein said outer race member has inwardly tapered conical end faces.

3. A track-roller bearing assembly as in claim 2, wherein said inner race member includes a cylindrical portion extending outwardly along said central axis from each end thereof.

4. A track-roller bearing assembly as in claim 3, wherein said realigning means is disposed between each said cylindrical portion and a respective conical end face of said outer race member.

5. A track-roller bearing assembly as in claim 4, wherein said realigning means comprises first and second wedge-shaped annular resilient ring members, a ring member being disposed at each end of the bearing assembly.

6. A track-roller bearing assembly as in claim 4, wherein said realigning means comprises at least one of an O-ring and an elastomeric washer member disposed at each end of the bearing assembly.

7. A track-roller bearing assembly as in claim 5, and further comprising an annular body of self-lubricating bearing material affixed to the outwardly facing bearing surface of said inner race member; said bearing portion of said outer race member being in sliding engagement with said bearing material.

8. A track-roller bearing assembly as in claim 6, and further comprising an annular body of self-lubricating bearing material affixed to the outwardly facing bearing surface of said inner race member; said bearing portion of said outer race member being in sliding engagement with said bearing material.

9. A track-roller bearing assembly as in claim 1, wherein said inner race member includes a cylindrical portion extending outwardly along said central axis from one end thereof.

10. A track-roller bearing assembly as in claim 9, wherein said outer race member has an inwardly tapered conical end face adjacent said one end of said inner race member.

11. A track-roller bearing assembly as in claim 10, further comprising a wedge-shaped ring member circumferentially mounted to said cylindrical portion of said inner race and wherein said realigning means is disposed between an inclined surface of said wedge-shaped ring member and said conical end face of said outer race member.

12. A track-roller bearing assembly as in claim 11, wherein said realigning means is and elastomeric washer member circumferentially mounted to said cylindrical portion of said inner race.

13. A track-roller bearing assembly as in claim 12, and further comprising an annular body of self-lubricating bearing material affixed to the outwardly facing bearing surface of said inner race member; said bearing portion of said outer race member being in sliding engagement with said bearing material.

14. A track-roller bearing assembly comprising:
    an inner ball race member having an outwardly facing arcuate peripheral bearing surface;
    an annular body of self-lubricating bearing material affixed to the bearing surface of said inner race member;
    an outer race member rotatable about an axis of said inner race member and angularly displacable relative to said axis of said inner race member, said outer race member including a bearing portion having an annular arcuate surface in sliding engagement with said bearing material; and
    means for realigning a central axis of said outer race member with said central axis of said inner race member when said race members have rotated angularly relative to each other, said realigning means being mounted between and immediately adjacent respective end portions of said inner and outer race members.

15. A track-roller bearing assembly as in claim 14, wherein said inner race member includes a cylindrical portion extending outwardly along said central axis from at least one end thereof.

16. A track-roller bearing assembly as in claim 15, wherein said outer race member has an inwardly tapered conical end face at at least one end thereof.

17. A track-roller bearing assembly as in claim 16, wherein said realigning means comprises a ring of elastomeric material.

18. A track-roller bearing assembly as in claim 17, wherein said realigning means is disposed between each said cylindrical portion and a respective conical end face of said outer race member.

19. A track-roller bearing assembly as in claim 17, wherein said realigning means comprises a wedge-shaped ring of elastomeric material.

20. A track-roller bearing assembly as in claim 17, wherein said realigning means comprises at least one of an O-ring and an elastomeric washer member.

21. A track-roller bearing assembly as in claim 20, further comprising a wedge-shaped ring member circumferentially mounted to said cylindrical portion of said inner race and wherein said realigning means comprises an elastomeric washer member disposed between an inclined surface of said wedge-shaped ring member and said conical end face of said outer race member.

22. A self-aligning bearing assembly as in claim 20, wherein said realigning means comprises both an O-ring and an elastomeric washer member and wherein each said cylindrical portion defines a circumferential recess for receiving a respective O-ring.

* * * * *

UNITED STATES PATENT AND TRADEMARK OFFICE
CERTIFICATE OF CORRECTION

PATENT NO. : 5,110,221
DATED : May 5, 1992
INVENTOR(S) : NARKON ET AL

It is certified that error appears in the above-identified patent and that said Letters Patent is hereby corrected as shown below:

Title Page, "[*] Notice: The portion of the term of this patent subsequent to Jun. 27, 1989 has been disclaimed." should be --[*] Notice: The portion of the term of this patent subsequent to Jun. 27, 2006 has been disclaimed.--

Signed and Sealed this

Thirteenth Day of July, 1993

Attest:

MICHAEL K. KIRK

*Attesting Officer*  *Acting Commissioner of Patents and Trademarks*